May 23, 1961  F. L. PUTZRATH  2,985,063
COMPOSITE PHOTOGRAPHY
Filed March 15, 1957
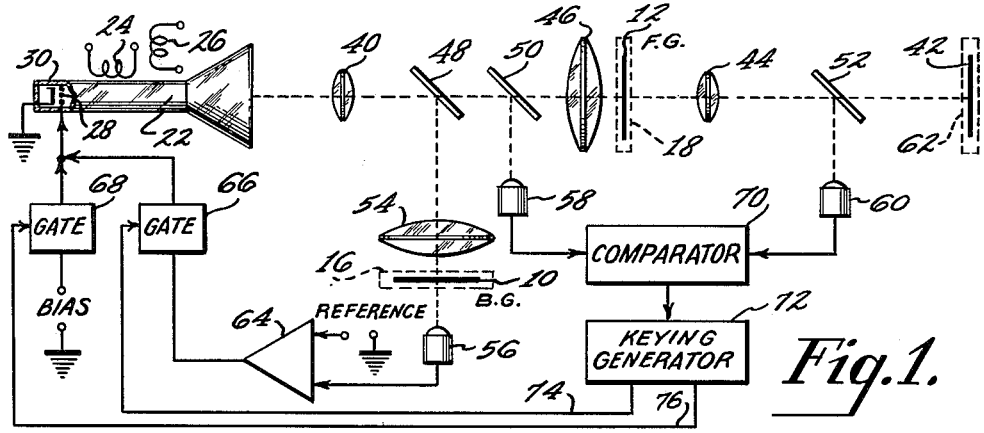
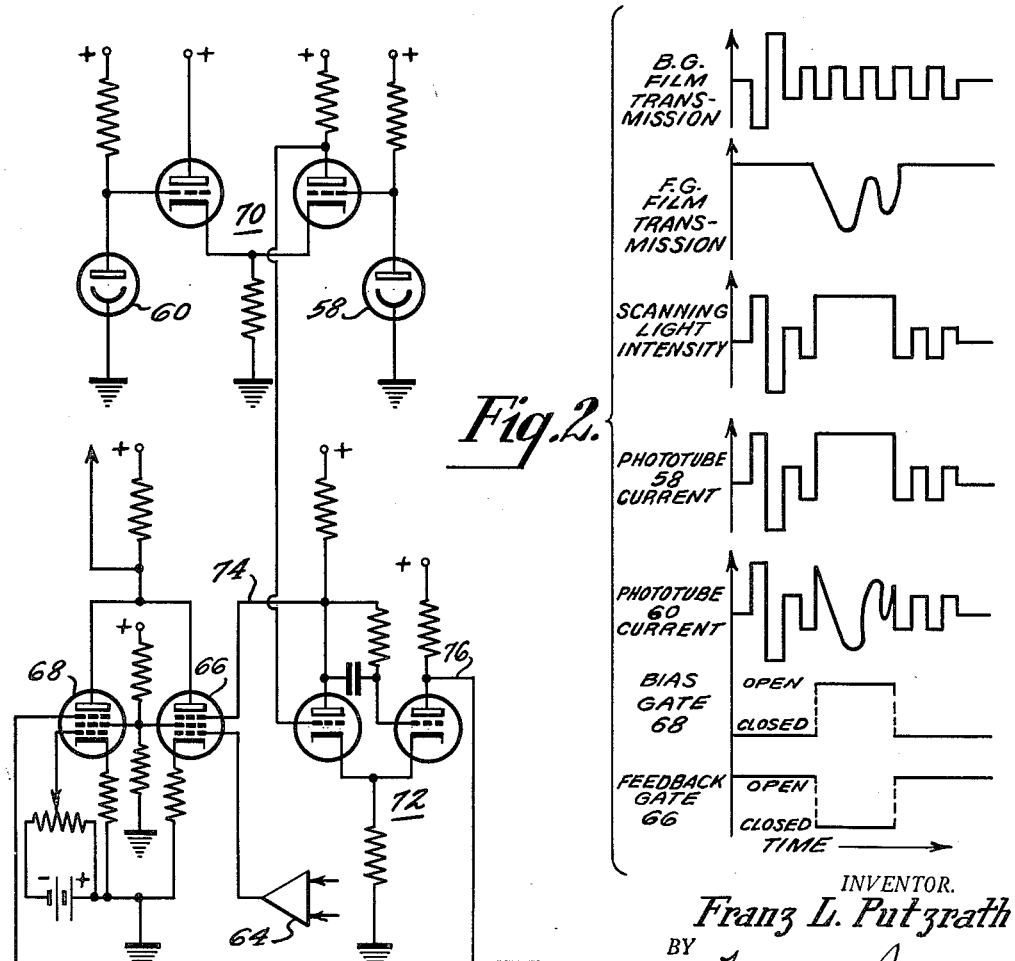
INVENTOR.
Franz L. Putzrath
BY
ATTORNEY.

United States Patent Office 2,985,063
Patented May 23, 1961

2,985,063
COMPOSITE PHOTOGRAPHY
Franz L. Putzrath, Oaklyn, N.J., assignor to Radio Corporation of America, a corporation of Delaware
Filed Mar. 15, 1957, Ser. No. 646,265
7 Claims. (Cl. 88—24)

This invention relates to systems for making a composite photograph from a plurality of photographs.

Various forms of motion-picture composite photography are described in the article "Some Special Photographic Effects Used in Motion-Picture Production" by Kellogg and Abbott in the "Journal of the Society of Motion Picture and Television Engineers," vol. 64, February 1955, page 57. One form of such composite photography is known as the traveling-matte process. This traveling-matte process affords a system for combining a foreground, or action, photograph with a background photograph.

In a copending patent application by G. L. Dimmick, Serial No. 646,321, filed March 15, 1957, a system is described that uses scanning illumination techniques for making composite photographs such as the traveling-matte composites.

It is among the objects of this invention to provide:

A new and improved composite photography system;

A new and improved traveling-matte composite photography system;

A new and improved composite photography system employing scanning illumination techniques; and A new and improved composite photography system employing electronic scanning techniques.

In accordance with this invention, a system for producing a composite photograph from a plurality of photographs includes a system for directing a moving light to one of the photographs, for example, the foreground to be modified thereby, and for directing the modified light to expose the composite photograph, and a means responsive to the light modified by the one photograph for controlling the intensity of the moving light to be a certain constant value or to be modulated in accordance with another photograph.

The foregoing and other objects, the advantages and novel features of this invention, as well as the invention itself both as to its organization and mode of operation, may be best understood from the following description when read in connection with the accompanying drawing, in which like reference numerals refer to like parts, and in which:

Figure 1 is a schematic block and optical diagram of a composite photography system embodying this invention;

Figure 2 is an idealized graph of the time relationships of waveforms that may occur in certain portions of the system of Figure 1; and Figure 3 is a schematic diagram of a circuit that may be used in a portion of the system of Figure 1.

In the composite photography system shown in Figure 1, two input photographs 10 and 12 are shown. The first film is sometimes designated a background (B.G.) film in composite photography. The second film is sometimes designated the foreground (F.G.), or action, film. In the system shown, the input films 10, 12 are transparencies. The foreground film 12 may be photographed with the action appearing against a certain backing. This backing provides in the film 12 a "surround" to the action that is clear. The density of the surround is substantially less than any part of the action image area. In this way, a distinct transparent border is formed in the film 12 around the foreground action.

Two printer projector heads 16 and 18 are provided for the films 10 and 12, respectively. These heads 16 and 18 each include a film transport system for positioning the films in suitably registered positions.

Both films 10 and 12 are scanned by means of a flying-spot cathode ray tube 22. This tube 22 has vertical and horizontal deflection coils 24 and 26 and a suitable electron gun that includes a control electrode 28 and a cathode 30. Deflection generators (not shown) drive the coils 24 and 26 so that the light spot at the screen of the tube traverses a scanning raster. A blanking system (not shown) for the horizontal and vertical retraces of the light spot may be used.

Light from the screen (not shown) of the cathode ray tube 22 is directed by an imaging lens 40 to the films 10 and 12. The foreground film 12 is imaged onto a sensitized photographic film 42 by means of an imaging lens 44. A field lens 46 images the lens 40 at the lens 44. Partially transmitting mirrors 48, 50, 52 are interposed to direct the light from the tube 22 into other optical paths. The mirror 48 directs the scanning light to the background film 10; and a field lens 54 images the light spot onto a phototube 56. The mirrors 50 and 52 respectively direct the scanning light to phototubes 58 and 60. A suitable camera 62 for the unexposed film 42 has a gate transport system operated in synchronism and register with those of the printer head 16 and 18.

The output voltage of the phototube 56 is applied to an amplifier 64, which also receives a reference voltage as an input. The output of the amplifier 64 is applied to a gate 66, the output of which is applied to the grid-cathode circuit of the cathode ray tube 22. This grid-cathode circuit of the tube 22 also receives the output of a second gate 68, the input of which is a constant bias voltage. Gating voltages for the gates 66 and 68 are derived from the combination of a comparator 70 and a keying generator 72. The comparator 70 receives the outputs of the phototubes 58 and 60, and the comparator outputs are applied to the keying generator 72. The keying generator 72 provides two different voltage levels at its outputs 74 and 76, which are respectively connected to the gates 66 and 68. The keying generator 72 assumes two different conditions. For one of these conditions the voltages at the outputs 74 and 76 are such that the gate 66 is opened and the gate 68 is closed. For the other such condition, the gates 66 and 68 are respectively closed and open. Known techniques for blanking the beam of the tube 22 on each horizontal and vertical deflection retrace may be used.

Reference is made to the idealized graph of Figure 2 to describe certain time relationships in the operation of the system of Figure 1. Assume that the gate 66 is open and the gate 68 is closed. Under those conditions, the gate 66 passes the output signal from the amplifier 64 to the cathode ray tube 22. Consequently, there is a closed feedback loop, partly optical, through the background film 10, and partly electrical including the phototube 56, amplifier 64, gate 66, and cathode ray tube 22. This feedback loop operates to tend to produce a constant output from the phototube 56 substantially equal to the reference input to the amplifier 64. In photographic terms, the feedback loop operates to produce on the screen of the cathode ray tube an image corresponding to that of the background film 10, but the photographic reverse of the background film image. Thus, if the background film 10 is a negative, the modulated light intensity of the spot on the screen of the cathode ray tube 22 corresponds to a photographic positive; and if the background film 10 is a positive, then the image on the screen of the tube 22 corresponds to a photographic negative.

This image inversion produced by the feedback loop is indicated graphically in Figure 2. The waveform for the scanning-light-intensity is the inverse of the waveform for the background film transmission.

The operation of the rest of the system is described with the assumption that the gate 66 is open, and the light intensity on the screen of the cathode ray tube 22 is modulated as the photographic inverse of the background film 10. It is also assumed that the background film 10 is a photographic positive, and the foreground film 12 is a photographic negative with a clear surround. Under these assumed conditions, the light spot of the cathode ray tube 22 is substantially unaffected by the clear surround of the foreground film 12 and is directed to the corresponding portion of the composite film 42 to expose that film 42 in accordance with its intensity. Thus, in raster positions of the light spot on the cathode ray tube 22 corresponding to the surround of the foreground film 12, the composite film 42 is exposed to an image of the corresponding part of the background film 10. This image on the film 42 is also a photographic positive.

As the scanning light spot traverses a surround region of the foreground film 12, the light directed to the phototube 60 is substantially unmodulated by the foreground film 12. Therefore, the light received by the phototube 60 is substantially the same as the light directed to the phototube 58 from a position in front of the foreground film 12. Under these conditions, the inputs to the comparator 70 are equal, the keying generator 72 is triggered to a condition in which the voltage on the output 74 holds the gate 66 open, and the voltage at the output 76 closes the gate 68. Thus, as the scanning light traverses the surround region in the film 12, the feedback loop continues to modulate the intensity of the light spot in accordance with the background image, and the corresponding portion of the film 42 is exposed with that image.

When the scanning light moves into an action region of the foreground film 12, the light transmitted by that action region of the film 12 is substantially attenuated compared to the effect of the clear surround region. Consequently, the light received by the phototube 60 is substantially less than the light received by the phototube 58. The corresponding difference in outputs of these phototubes 58 and 60 is detected by the comparator 70, which comparator 70 operates to trigger the generator 72 into the other condition. The voltage at the generator output 76 is then such as to open the gate 68, and the voltage at the output 74 closes the gate 66. Accordingly, a constant bias voltage is applied to the grid-cathode circuit of the cathode ray tube 22 via the open gate 68. Thus, as the scanning light spot crosses from a surround region into an action region in the foreground film 12, a switching operation takes place in which the light intensity of the cathode ray tube is changed to a constant, unmodulated intensity.

The constant intensity light spot from the cathode ray tube 22 illuminates the action region of the foreground film 12, and, thereby, an image of that action region is projected to the corresponding portion of the composite film 42. Since the light spot intensity is not modulated in raster positions corresponding to the action portion of the foreground film, the corresponding portions of the background film 10 have no effect on the composite exposure on the film 42. The closure of the gate 66 during the times of raster positions of the light spot corresponding to the action portion of the foreground film 12 has the effect of breaking the feedback loop. Thereby, the corresponding portions of the background film 10 are omitted from the composite film. Accordingly, the foreground exposure on the composite film 42 appears to be in front of the background exposure on that film 42.

When the scanning light spot of the cathode ray tube 22 moves in its raster from a position corresponding to an action region to one corresponding to a surround region, the output of the phototube 60 becomes substantially equal to that of the phototube 58. The generator 72 is triggered by the comparator output to a condition in which the gate 66 is opened and the gate 68 is closed. Consequently, the feedback loop is restored, and the intensity of the scanning light spot is then modulated in accordance with the background film 10. Thus, as the surround regions of the film 12 are traversed by the scanning light spot, it is modulated to expose the composite film 42 in accordance with the background film 10.

This operation is repeated in a similar manner with each movement of the scanning light spot in its raster into and out of an action region of the foreground film 12. Depending upon the subject matter of the foreground film 12, there may be a plurality of switching operations of the type described above with respect to Figure 2, or there may be no switching operation in a particular line. The exposure of the film 42 in the situation in which there is no switching in a line is either all foreground or all background. Thus, with a complete scanning of the films 10 and 12, a composite film 42 is exposed that has effectively a foreground image inserted in front of a background image.

In certain applications, the input films may not be describable as "foreground" and "background." However, the image of one of the input films is to be inserted in front of the image of the other. The border of the image to be inserted is used as the key image that controls the switching operation in a manner described above with respect to Figure 1, in which the foreground image operates as the key image.

With this system, the optical requirements of the surround region of the foreground film are that it provide a minimum of attenuation of the modulated light spot of the cathode ray tube 22, and that it be uniform. The input films 10 and 12 may be black and white transparencies and either positives or negatives depending upon the requirements of a particular system. Due to the photographic inversion by the feedback loop, the background film is the photographic inverse of the foreground film. The composite film 42 for such inputs is likewise a black and white film and the photographic inverse of the foreground film 12. Where the input films 10 and 12 are color transparencies, black and white color separations may be exposed over successive scannings by means of colored filters inserted over the face of the flying spot tube. Each such filter permits monochromatic operation of the system. Among the known techniques for deriving a foreground film that is suitable for supplying keying information is that in which an ultraviolet sensitive film is exposed with the foreground scene in front of a screen backlighted with ultraviolet light.

The cathode ray tube 22 is used as a source of illumination for optically imaging the action region of the foreground 12 onto the composite film 42. Thus, as to that action region, there is no resolution limitation imposed by the size of the scanning light spot except in the vicinity of the border of this action image. The quality of the background image on the composite film 42 depends somewhat on the size of the scanning light spot, since that light spot carries the image of the background region. The keying response from fine border detail depends upon the phosphor decay time, spot size, and scanning rate. Since the cathode ray tube 22 is used to generate an electronic switching signal, its phosphor should have a relatively fast decay.

For the feedback action, a second flying-spot cathode ray tube (not shown) could be used to serve as a "video" generator for the background signal that is passed by the gate 66 to modulate the intensity of the light from the tube 22. Registration between such a second cathode ray tube and the imaging tube 22 would not be critical, since the second tube would influence only the less critical placement of the foreground scene against the background.

In Figure 3, suitable electrical circuitry for the comparator 70, the keying generator 72, and the gates 66 and 68 is shown. Parts corresponding to those previously described are referenced by the same numerals. The comparator 70 is shown as a difference amplifier that includes a pair of cathode coupled triodes having a common cathode resistor. The phototubes 58 and 60 are respectively connected to the grids of the two tubes of the difference amplifier 70. The output of the difference amplifier 70 is taken from the anode of one of the tubes and applied to the grid of the triggering tube of a Schmitt trigger circuit 72. The gates are shown as multigrid tubes 66 and 68, the second grids of which receive the trigger circuit outputs 74 and 76, respectively, from the anodes of the trigger circuit tubes. The first grid of the gate tube 66 receives the output of the amplifier 64, and the first grid of the gate tube 68 receives a constant bias voltage. The anodes of the gate tubes 66 and 68 are connected together and to a common anode resistor. The anodes of these gate tubes 66 and 68 may be connected to the grid 28 of the cathode ray tube 22 in Figure 1.

In operation, when a surround region of the foreground film 12 receives the scanning light spot, the currents drawn by the phototubes 58 and 60 are same. The output voltage of the difference amplifier 70 is relatively low, the left-hand tube of the trigger circuit 72 is cut off, and the voltage at the output 74 is relatively high. At the same time, the right-hand tube of the trigger circuit 72 is conducting and the voltage at the output 76 is relatively low. Accordingly, the feedback gate tube 66 is rendered conductive to pass the output of the amplifier 64, and the bias gate tube 68 is cut off. The feedback loop is completed, and the scanning light spot has a modulated intensity.

When the scanning light spot is imaged onto an action region of the foreground film 12, the light received by the phototube 60 is less than that of the phototube 58. Consequently, the tube 58 conducts more current, and the right-hand side of the difference amplifier 70 conducts a lesser amount than the left-hand side. Accordingly, the output voltage at the difference amplifier 70 rises to render the left-hand tube of the trigger circuit 72 conductive. The voltage at the output 74 falls to a relatively low value to cut off the the tube 66; and the voltage at the output 76 rises to render the tube 68 conductive. Accordingly, the voltage passed to the grid of the cathode ray tube 22 is the constant bias voltage, which produces a constant-intensity light-spot.

Related composite photography system are described in the copending patent applications, Serial No. 646,340 by H. E. Haynes, and Serial No. 646,338 by H. E. Haynes and F. L. Putzrath, both filed concurrently herewith on March 15, 1957.

In accordance with this invention, a new and improved composite photography system is provided. Scanning illumination techniques are used in part for making composite photographs such as traveling-matte composites. A single scanning cathode ray tube may be used.

What is claimed is:

1. In a system for exposing a composite photographic element from a plurality of photographic transparencies, the combination of means for providing moving light, means for directing said moving light through said plurality of transparencies and for directing said light transmitted through one of said transparencies to expose said composite element, and means responsive to light transmitted through said one transparency for controlling the intensity of said moving light either to be a certain constant value or to vary in accordance with the light transmitted through another of said transparencies at mutually exclusive times.

2. In a system for exposing a photographic element as a composite of a plurality of photographic transparencies, the combination of means for exposing said composite a line at a time through image portions of one of said transparencies with illuminating light having a certain constant intensity, and means responsive to light transmitted through other portions of said one transparency for varying said light intensity in accordance with image portions of another of said transparencies, said varying from a certain constant intensity to a varying intensity occurring at mutually exclusive times.

3. In a system for exposing a photographic element as a composite of a plurality of photographic transparencies, the combination of scanning means for providing a moving illuminating light beam, means for simultaneously directing a different portion of said moving light beam through each of said transparencies and for directing the portions of said light beam through one of said transparencies to expose said element, means for comparing the intensity of light directed to said one transparency with the light transmitted thereby and for producing electrical signals in accordance with the comparison, and means responsive to said signals for controlling the said illuminating light beam.

4. In a system for exposing a photographic element as a composite of a plurality of photographic transparencies, the combination of cathode ray tube scanning means for providing a moving light beam, means for simultaneously directing a different portion of said moving light beam through each of said transparencies and for directing the light through one of said transparencies to expose said element, photoelectric means for converting the light through another of said transparencies to varying electrical signals, first circuit means connecting said photoelectric means to said cathode ray tube scanning means for applying said varying electrical signals to said cathode ray tube scanning means to thereby vary the intensity of said light beam, second circuit means connected to said cathode ray tube scanning means for applying thereto constant electrical signals to thereby maintain the intensity of said light beam constant, and switch means responsive to light through said one transparency for alternatively rendering either said first circuit means or said second circuit means operative to supply either said varying electrical signals or said constant electrical signals to said scanning means to control the light intensity thereof accordingly.

5. In a system for exposing a photographic element as a photographic composite of a plurality of photographic records, the combination of a light source, means for simultaneously directing moving light beams from said source to said records, certain portions of both of said records modifying the intensity of said light beams at mutually exclusive times as impressed on said composite element, and means controlled by the light passing through one of said records for changing the intensity of the light beam impressed on both of said records.

6. A system in accordance with claim 5 in which the intensity of said light beams varies from a constant value over certain of the same relatively positioned areas of said records to a varying value over the same other relatively positioned areas of said records.

7. A system in accordance with claim 5 in which said photographic records are photographic transparencies.

References Cited in the file of this patent

UNITED STATES PATENTS

| | | |
|---|---|---|
| 2,164,297 | Bedford | June 27, 1939 |
| 2,336,508 | Smith | Dec. 14, 1943 |

FOREIGN PATENTS

| | | |
|---|---|---|
| 525,082 | Belgium | Dec. 31, 1953 |
| 489,644 | Italy | Jan. 25, 1954 |